United States Patent [19]

Suzuki et al.

[11] Patent Number: 4,882,621
[45] Date of Patent: Nov. 21, 1989

[54] COLOR IMAGE RECORDING APPARATUS

[75] Inventors: Akio Suzuki; Yoshihiro Takada, both of Yokohama, Japan

[73] Assignee: Canon Kabushiki Kaisha, Tokyo, Japan

[21] Appl. No.: 117,528

[22] Filed: Nov. 6, 1987

[30] Foreign Application Priority Data

Nov. 10, 1986 [JP] Japan .................................. 61-265587

[51] Int. Cl.⁴ .............................................. G03F 3/08
[52] U.S. Cl. ....................................... 358/80; 358/302
[58] Field of Search ................... 358/75, 79, 80, 296, 358/302; 355/32, 88, 3

[56] References Cited

U.S. PATENT DOCUMENTS

| | | |
|---|---|---|
| 3,898,670 | 8/1975 | Erikson et al. . |
| 4,205,350 | 5/1980 | Gunning . |
| 4,229,095 | 10/1980 | Mir . |
| 4,481,532 | 11/1984 | Clark et al. ............................ 358/80 |
| 4,482,917 | 11/1984 | Gaulke et al. ........................ 358/80 |
| 4,528,576 | 7/1985 | Koumura et al. . |
| 4,533,928 | 8/1985 | Sugiura et al. . |
| 4,550,053 | 10/1985 | Arai et al. . |
| 4,555,437 | 11/1985 | Tanck . |
| 4,592,951 | 6/1986 | Viola . |
| 4,617,580 | 10/1986 | Miyakawa . |
| 4,666,757 | 5/1987 | Helinski . |
| 4,675,696 | 6/1987 | Suzuki . |
| 4,686,538 | 8/1987 | Kouzato . |
| 4,785,313 | 11/1988 | Higuma et al. . |
| 4,788,563 | 11/1988 | Omo et al. . |

FOREIGN PATENT DOCUMENTS 0130612 9/1985 European Pat. Off. .
58-136480 6/1983 Japan .

Primary Examiner—Clifford C. Shaw
Assistant Examiner—Lincoln Donovan
Attorney, Agent, or Firm—Fitzpatrick, Cella, Harper & Scinto

[57] ABSTRACT

A color image recording apparatus which can form by color correction, a high-quality image on a recording material, with which an image is printed on a back surface of a transparent layer thereof and the printed image is observed from the transparent layer side and can protect an image surface or improve image quality. The apparatus comprises input means for inputting color image information; color correcting means for performing color correction of the color image information; converting means for performing mirror image conversion of the color image information; image forming means for performing image formation based on image signals from the color correcting means; and means for changing correcting parameters of the color correcting means and instructing a converting operation by the converting means in correspondence with types of recording materials of the image forming means.

6 Claims, 7 Drawing Sheets

4,882,621

COLOR IMAGE RECORDING APPARATUS

BACKGROUND OF THE INVENTION

1. Field of the Invention

The present invention relates to a color image recording apparatus capable of forming a high-quality color image by an ink-jet scheme.

2. Related Background Art

An ink-jet recording apparatus of non impact type is widely used as a color recording apparatus due to noiseless operation and easy color image formation. However, a recording material used in such an ink-jet recording apparatus must absorb ink liquid fast, and hence it tends to be difficult to perform printing on a recording material such as high-quality paper or film with gloss.

In order to perform printing on a transparent recording material such as an OHP sheet, an ink liquid must have a vivid color and a sufficient concentration. However, a conventional OHP sheet has an insufficient ink absorbency. In order to protect an image recorded with an ink liquid or to improve image quality, a transparent resin film may be laminated on a recording material such as an OHP sheet. However, immediately after recording, since ink applied to the recording material is not yet sufficiently dried, the ink is evaporated by heat upon lamination of the film, resulting in poor lamination.

In order to improve ink absorbency, a film sheet wherein an ink reception layer having high ink absorbency is provided on a transparent base film is proposed (Japanese Patent Laid-open No. 136480/1983). The film sheet has a high ink absorption speed, and allows recognition of a recorded content from a surface opposite to the surface on which the ink is attached. Therefore, this is equivalent to a state wherein the recorded content is coated by a base film, and a high-quality image with gloss can be obtained.

SUMMARY OF THE INVENTION

It is an object of the present invention to provide a color image recording apparatus which can form, by color correction, a high-quality image on a recording material, with which an image is printed on a back surface of a transparent layer thereof and the printed image is observed from the transparent layer side and can protect an image surface or improve image quality.

It is another object of the present invention to provide a color image recording apparatus which can form an image with substantially the same color tone on a normal recording material such as a paper sheet.

It is still another object of the present invention to provide a color image recording apparatus which can achieve the above objects for image data read by image read means.

The above and other objects of the present invention will become apparent from the following description of an embodiment.

DESCRIPTION OF THE PREFERRED EMBODIMENTS

Figure 1:
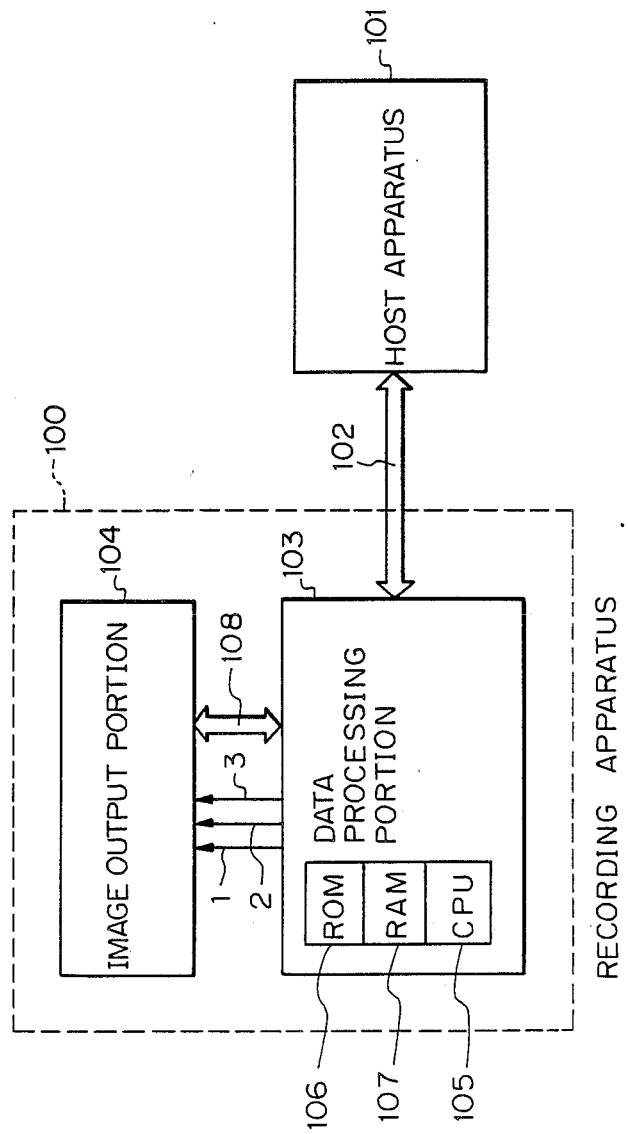
FIG. 1 is a block diagram schematically showing the overall arrangement according to a first embodiment of the present invention.

FIG. 1 shows a connection state of a recording apparatus 100 according to a first embodiment of the present invention, and an external host apparatus 101, such as a microcomputer, for operating the apparatus 100. The recording apparatus 100 and the host apparatus 101 are connected to each other through a bus line 102, and image data to be recorded is sent from the host apparatus 101 to the recording apparatus 100.

The recording apparatus 100 receives the image data at a data processing portion 103 through the bus line 102. The image data is converted by the portion 103, and the converted data is output to an image output portion 104 through lines 1 to 3.

The data processing portion 103 includes a central processing unit (CPU) 105 for controlling data processing, a memory (ROM) 106 storing a processing sequence of the CPU 105, and a memory (RAM) 107 for storing image data input through the bus line 102 and including counters and flags necessary for performing data processing.

The image output portion 104 records a color image signal from the data processing portion 103 on a recording medium. Note that the image output portion 104 and the data processing portion 103 are connected to each other through a control line 108, and the CPU 105 controls the operation of an image forming portion 13 (to be described later). The image output portion 104 is shown in FIG. 2 in detail.

Figure 2:
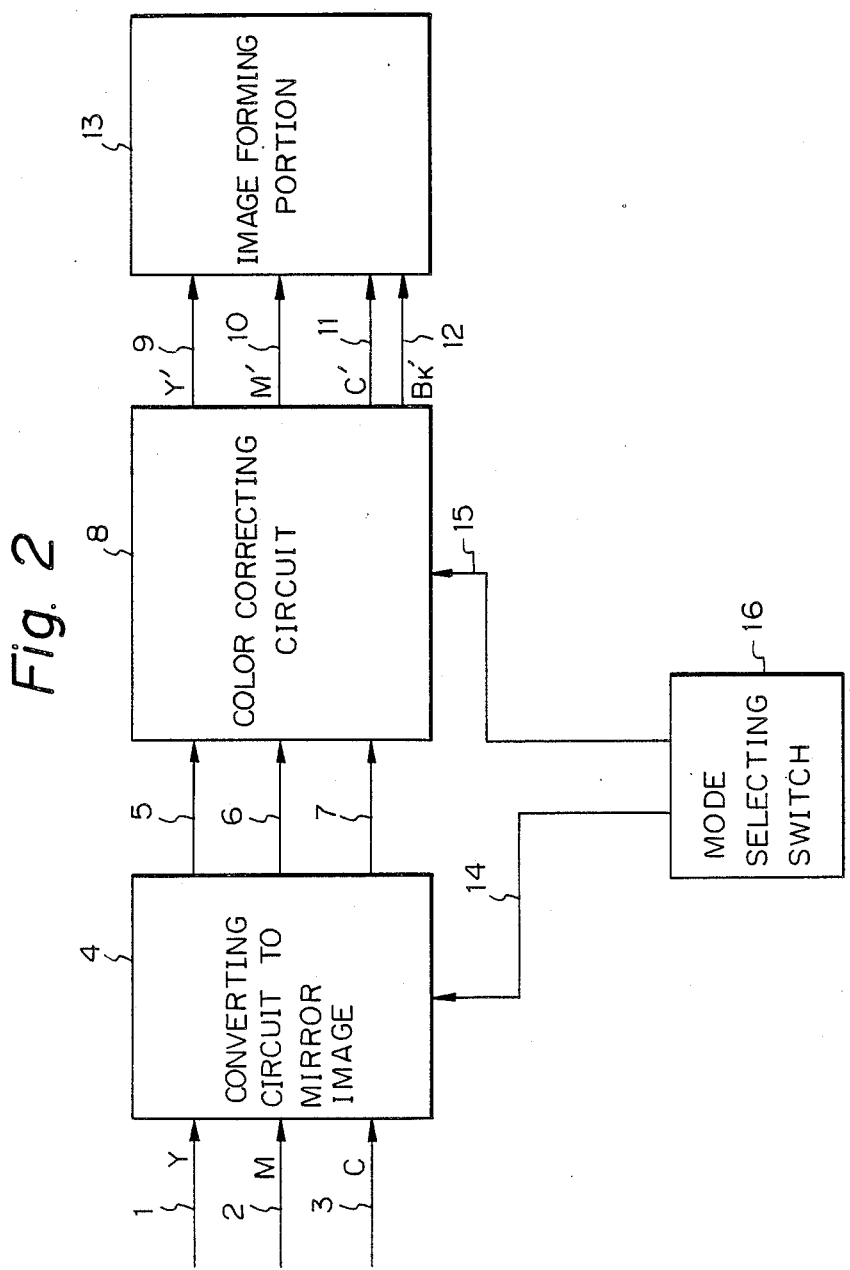
FIG. 2 is a block diagram of an image output portion.

In FIG. 2, digital color image signals 1 to 3 respectively represent yellow (Y), magenta (M), and cyan (C) densities and images. A mirror image converting circuit 4 converts an input image signal into a mirror image, such that the color image signals 1 to 3 are temporarily stored in a memory and are then read out in the order for obtaining a mirror image. Mirror-converted Y, M and C signals are represented by 5 to 7 in FIG. 2.

A color correcting circuit 8 is a circuit for performing known color correction, e.g., a masking circuit, a UCR circuit, gamma correcting circuits for respective colors, and the like. The color correcting circuit 8 is arranged to change color correcting parameters such as a masking coefficient, a UCR coefficient, a gamma value, and the like in response to a color correcting parameter changing signal 15. The Y, M and C signals 5 to 7 are converted to Y', M', C' and Bk' signals 9 to 12 by the color correcting circuit 8. An image forming portion 13 forms an image by a color ink-jet scheme. A mode selecting switch 16 is adopted to selectively output a changing instruction of color correcting parameters by the color correcting circuit 8 and a mirror image converting instruction signal 14 in accordance with types of recording materials (printing media) at the image forming portion 13 or types of image signals.

The mirror converting circuit 4 performs mirror image conversion of the input color image signals 1 to 3 when the instruction signal 14 is set at level "1". When the instruction signal 14 is set at level "0", the circuit 4 outputs the signals 1 to 3 as the image signals 5 to 7 without modification.

Figure 3:
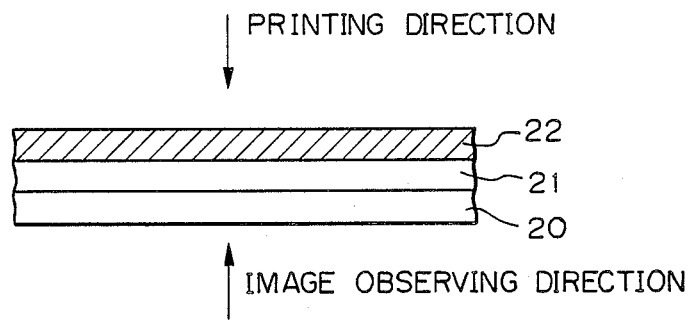
FIG. 3 is a sectional view of a recording material.

Description of Printing Medium (FIG. 3)

FIG. 3 is a sectional view of a printing medium as a recording material used in the apparatus of this embodiment.

The printing medium comprises a transparent layer 20 as a support member, an ink holding layer 21 for absorbing and catching a recording liquid formed on the transparent layer 20, and an ink transfer layer 22. The ink transfer layer 22 accepts a color recording liquid from an ink-jet head, and transfers the recording liquid to the ink holding layer 21 without absorption. Ink droplets flying from the ink-jet head to the ink transfer layer 22 are held in the ink holding layer 21. When this state is viewed from the side of the transparent layer 20, a very high-quality image with gloss can be observed. In addition, since the image surface is covered by the transparent layer 20, high weather resistance can be provided.

The mode selecting switch 16 is adopted to designate a mode corresponding to a recording material to be used. When a normal recording material is used, the switch 16 sets both the mirror image converting instruction signal 14 and the color correcting parameter changing signal 15 at level "0". Thus, the color image signals 1 to 3 pass through the mirror image converting circuit 4 without being mirror-image converted, and are then subjected to color correction suitable for the normal recording material. Thereafter, a color image corresponding to the color image signals are formed on the recording material by the image forming portion 13.

In a mode using the recording material shown in FIG. 3 in which an image is observed from the transparent layer 20 side and a mirror image is formed on the back surface, the switch 16 sets the signals 14 and 15 at level "1". As a result, the color image signals 1 to 3 are mirror-image converted by the mirror image converting circuit 4, and are then sent to the color correcting circuit 8. The color correcting processing parameters of the color correcting circuit 8 are set to be values different from those for the normal recording material, so that colors recorded on a recording material having the ink holding layer 21 and the ink transfer layer 22 on the transparent layer 20 are the same as those recorded on the normal recording material. For example, even if the overlapping order of colors is reversed to that in the case of the normal recording material, color reproduction can be performed by color correction in the same manner as in the base of the normal recording material.

Figure 4:
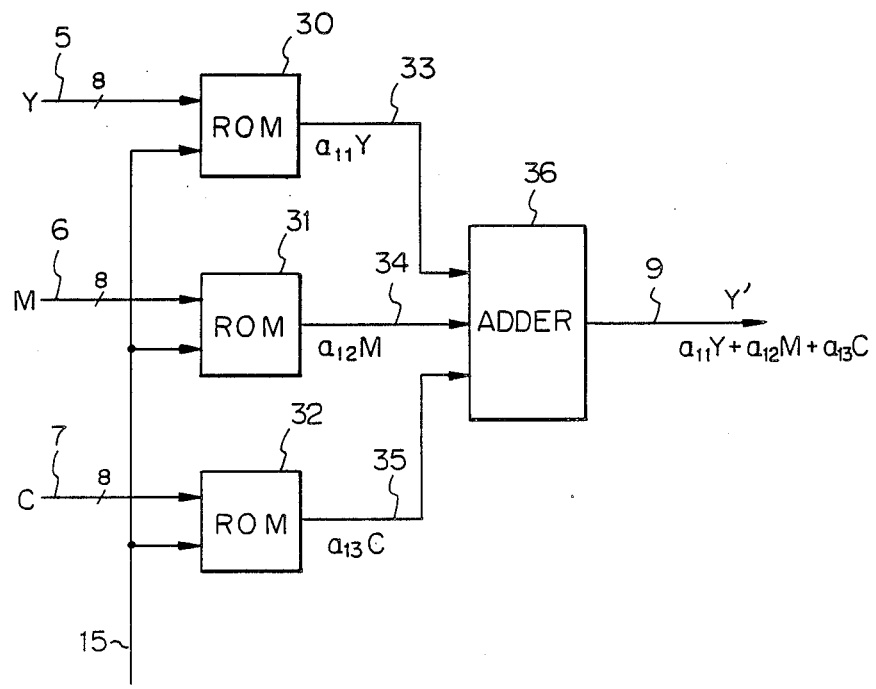
FIG. 4 is a block diagram of a yellow signal conversion portion of a color correcting circuit.

Description of Color Correcting Circuit (FIG. 4)

FIG. 4 shows part of the color correcting circuit 8, in particular, a Y signal converting circuit. For example, in the color correcting circuit 8, when three color input signals Y, M and C are subjected to color correction, e.g., masking processing represented by following formulas to obtain output signals Y', M' and C':

$$Y'=a_{11}Y+a_{12}M+a_{13}C$$

$$M'=a_{21}Y+a_{22}M+a_{23}C$$

$$C'=a_{31}Y+a_{32}M+a_{33}C$$

the coefficients $a_{11}$ to $a_{22}$ are switched in accordance with the color correcting parameter changing signal 15. FIG. 4 shows this arrangement in detail.

The converting circuit shown in FIG. 4 receives the 8-bit Y, M and C color signals 5 to 7 from the mirror image converting circuit 4, and the 1-bit color correcting parameter changing signal 15. The circuit includes coefficient multiplier ROMs 30 to 32, which respectively output 8-bit signals 33 to 35 representing multiplication results. The circuit also includes an adder 36, which sums the signals 33 to 35 to output a masked signal $Y'=a_{11}Y+a_{12}M+a_{13}C$.

The 8-bit Y signal 5 is input at a lower 8-bit address position of the coefficient multiplier ROM 30, and the 1-bit color correcting parameter changing signal 15 is input at a 9th-bit address position from the least significant bit position. In the ROM 30, if the lower 8-bit address signal is given as A, a value of $a_{11}A$ is stored at the address A. Two types of color correction are set in accordance with the value of the 9th-bit changing signal 15. For example, if the changing signal 15 is at level "0", $a_{11}Y$ is used, and if the signal 15 is at level "1", $a_{11}'Y$ is used. Similarly, the ROM 31 performs multiplication of the M signal, and the ROM 32 performs multiplication of the C signal.

In this manner, when the color correcting parameter changing signal 15 is at level "0", the output from the adder 36 corresponds to $Y'=a_{11}Y+a_{12}M+a_{13}C$, and when it is at level "1", corresponds to $Y'=a_{11}'Y+a_{12}'M+a_{13}'C$.

Similar circuit are provided for magenta and cyan, so that the following color correction can be performed in accordance with the value of the color correcting parameter signal:

$$Y'=a_{11}Y+a_{12}M+a_{13}C$$

$$M'=a_{21}Y+a_{22}M+a_{23}C$$

$$C'=a_{31}Y+a_{32}M+a_{33}C$$

or $$Y'=a_{11}'Y+a_{12}'M+a_{13}'C$$

$$M'=a_{21}'Y+a_{22}'M+a_{23}'C$$

$$C'=a_{31}'Y+a_{32}'M+a_{33}'C$$

For example, coefficients $a_{11}$ to $a_{33}$ are selected so that a color difference between an original and a final output is minimized when the normal recording sheet is used. When the recording material shown in FIG. 3 is used, $a_{11}'$ to $a_{33}'$ are selected to minimize the color difference.

In this manner, since the masking coefficients are switched in accordance with the types of recording materials, good reproducibility can be maintained.

The color correcting means is not limited to the above-mentioned masking processing. For example, the following UCR processing may be employed:

$$Bk'=b_1 \times \min(Y,M,C)$$

$$Y'=Y-b_2 \times \min(Y,M,C)$$

$$M'=M-b_3 \times \min(Y,M,C)$$

$$C''=C-b_4 \times \min(Y,M,C)$$

or, the following gamma correcting processing may be employed:

$$Y' = \gamma_1 \times Y$$

$$M' = \gamma_2 \times M$$

$$C' = \gamma_3 \times C$$

These coefficients $b_1$ to $b_4$ or $\gamma_1$ to $\gamma_3$ may be switched to obtain the same effect.

Figure 5:
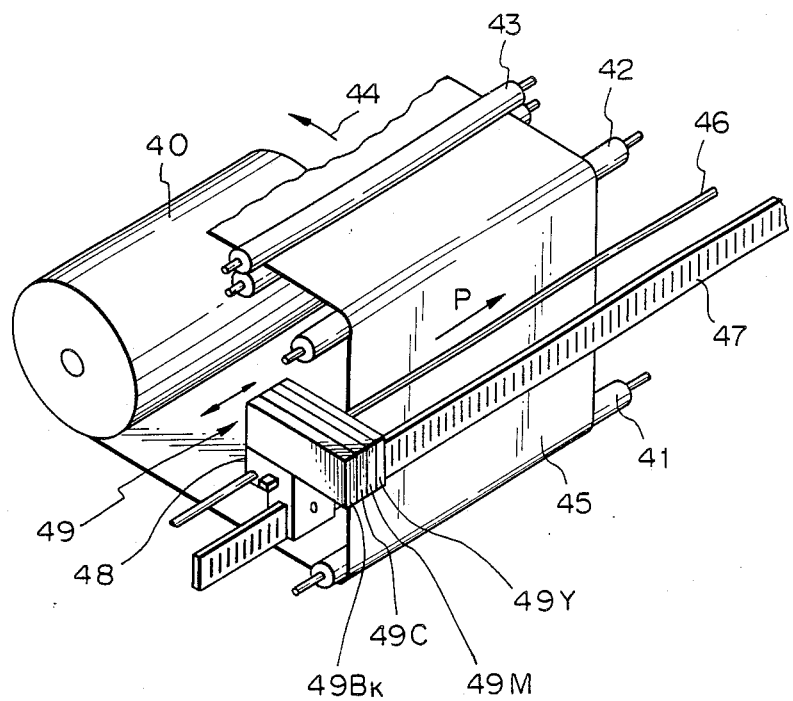
FIG. 5 a perspective view of an image forming portion.

Description of Image Forming Portion (FIG. 5)

FIG. 5 is a detailed perspective view of the image forming portion 13 mounting an ink-jet recording head of drop-on-demand type.

In FIG. 5, the leading end of a roll of a recording material 40 is gripped by feed rollers 43 through convey rollers 41 and 42, and is fed in a direction 44 upon rotation of these rollers. Parallel guide rails 46 and 47 are arranged to cross a recording material 45. A recording head unit 49 mounted on a carriage 48 scans in the horizontal direction along the guide rails 46 and 47. Heads 49Y, 49M, 49C and 49Bk of four colors, i.e., yellow, magenta, cyan, and black are mounted on the carriage 48, and ink tanks of four colors are provided in correspondence therewith. The recording material 45 is intermittently fed by a length corresponding to a printing width of the recording heads 49. When the recording material 45 is stopped, the recording heads 49 scan in a P direction, and eject ink droplets corresponding to the image signals.

Figure 6:
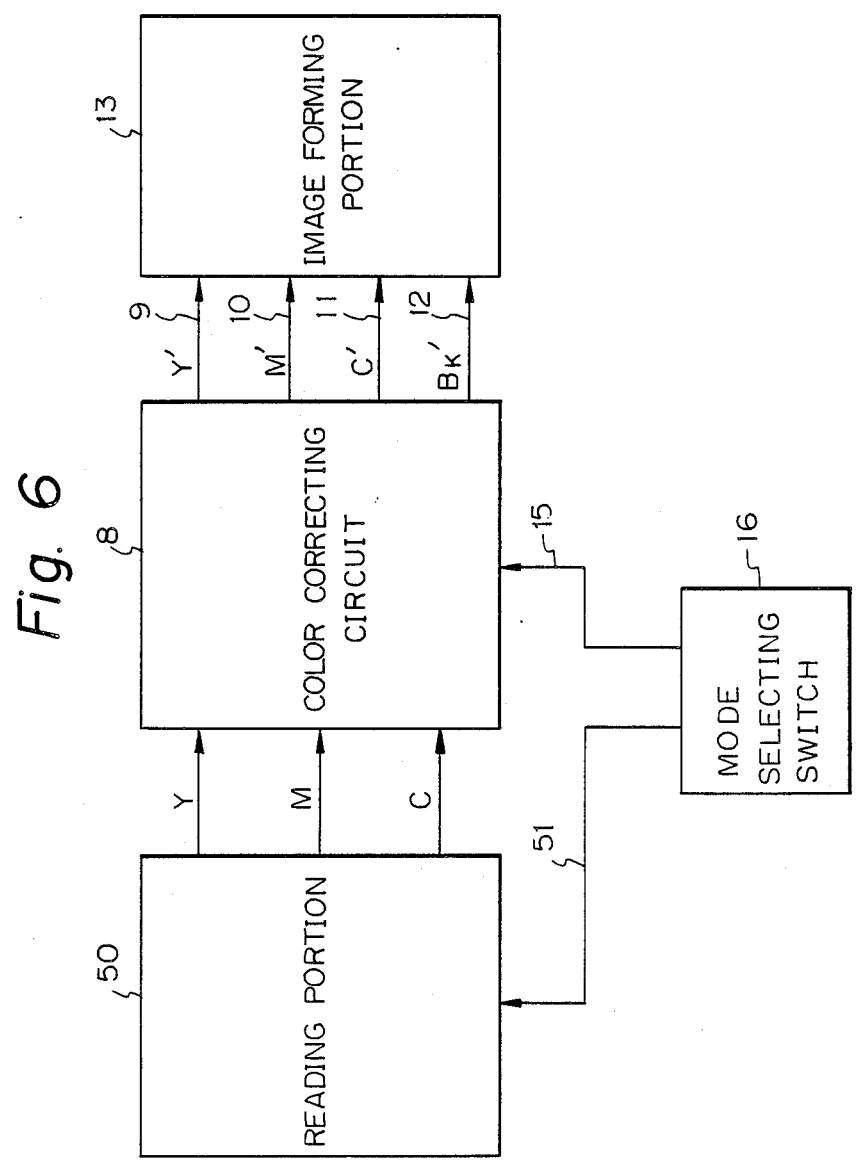
FIG. 6 a block diagram of a second embodiment.
Figure 7:
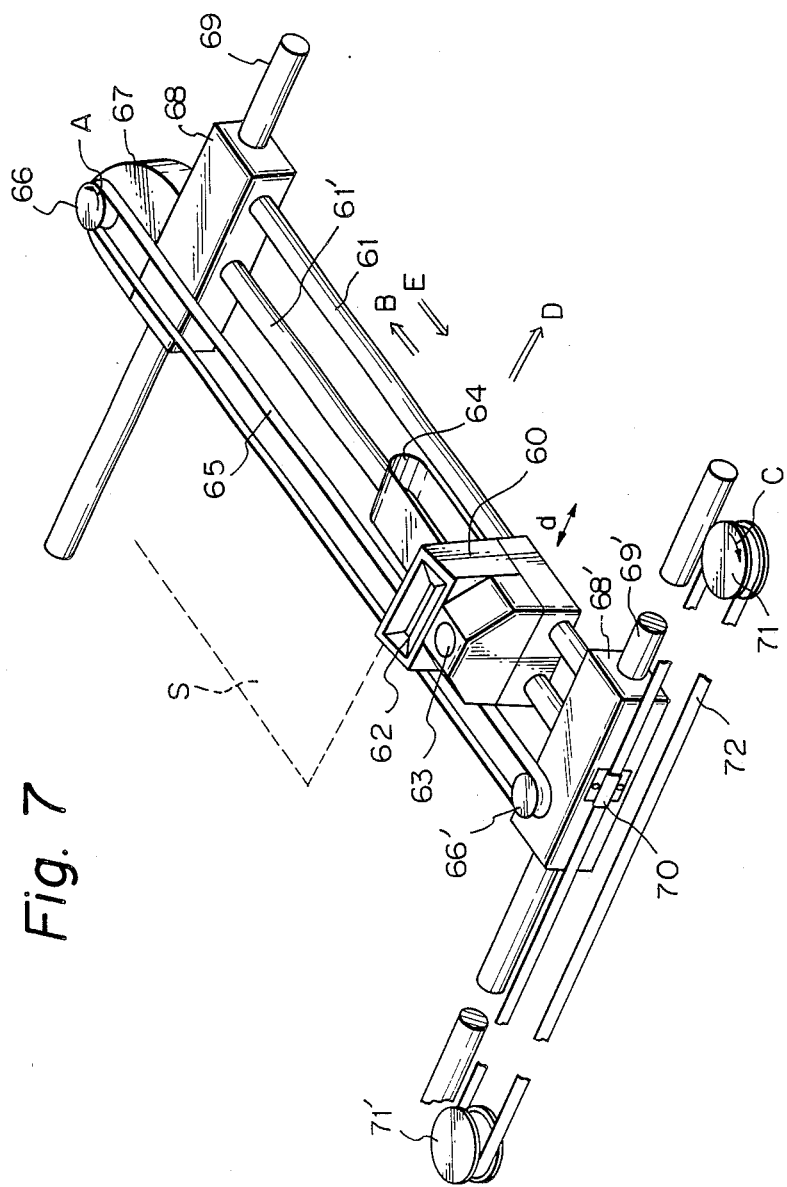
FIG. 7 is a perspective view of a reader portion of the second embodiment.
Figure 8:
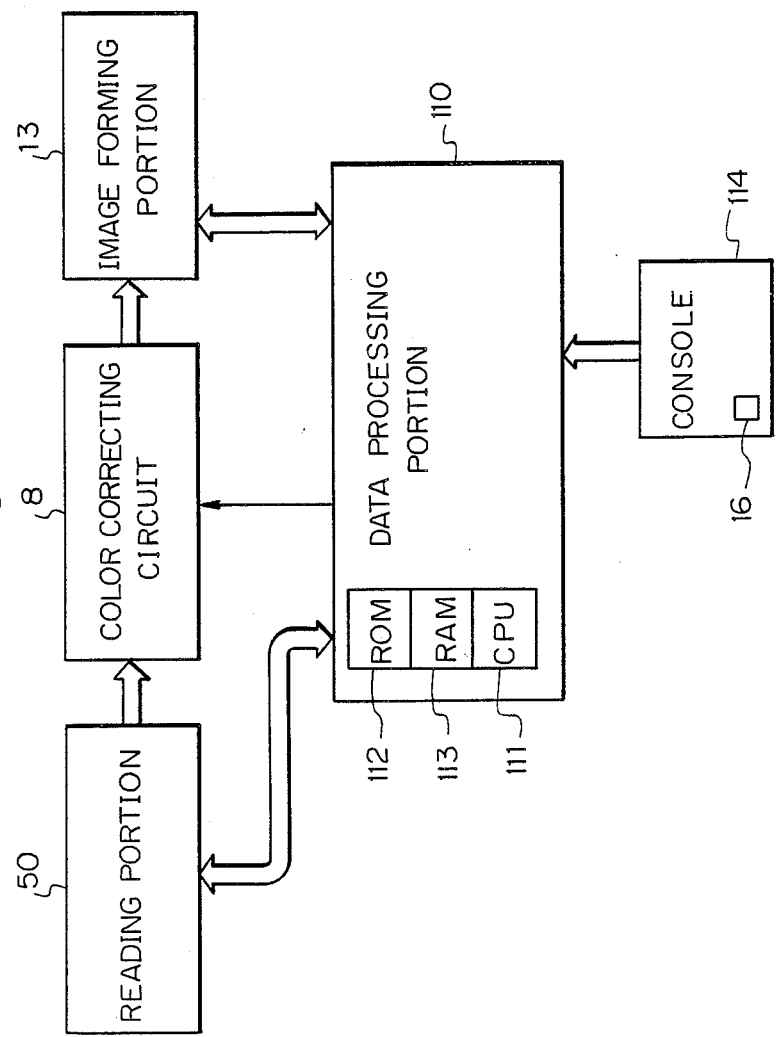
FIG. 8 is a block diagram schematically showing the overall arrangement of the second embodiment.

Description of Second Embodiment (FIGS. 6, 7, and 8)

FIG. 6 is a block diagram showing a color ink-jet printer according to another embodiment of the present invention, and the same reference numerals in FIG. 6 denote the same parts as in FIG. 2. A difference from the first embodiment is that a color original is read by a reading portion 50 so as to input Y, M and C color image signals.

FIG. 7 is a perspective view showing the reading portion 50.

A transparent glass plate or the like is placed on a scanning portion of a read head 60. An original S is placed on the glass plate facing down, and is read by the read head 60 from the below. Note that the read head 60 is in its home position in FIG. 7.

In FIG. 7, the read head 60 is slidably moved along a pair of guide rails 61 and 61' to read the original S. The read head 60 comprises a light source 62 for illuminating an original, a lens 63 for focusing an original image onto a photoelectric converting element such as a CCD, and the like. A flexible conductive cable bundle 64 performs power supply to the photoelectric converting element, and transmission of image signals from the element.

The read head 60 is fixed to a drive power transmission portion 65 such as a wire for a main scan direction (B and E directions). The main scan drive power transmission portion 65 is looped between pulleys 66 and 66', and is moved upon rotation of a main scan pulse motor 67. Upon rotation of the pulse motor 67 in a direction indicated by an arrow A, the read head 60 reads line information of the original S perpendicular to the main scan direction B with a number of bits corresponding to the photoelectric converting element group while moving in the direction B.

After the read operation of the original S is performed by a required width, the main scan pulse motor 67 is rotated in a direction opposite to the arrow A. Thus, the read head 60 is moved in the direction E, and is returned to the home position. Carriages 68 and 68' are slidably moved along guide rails 69 and 69' in a sub-scan direction substantially perpendicular to the main scan direction B. The carriage 68' is fixed by a fixing member 70 to a drive power transmission portion 72 in the sub-scan direction (D) such as a wire looped between pulleys 71 and 71'.

After the main scan (B) operation is completed, the pulley 71 is rotated in a direction indicated by an arrow C by a sub-scan drive source (not shown) such as a pulse motor or a servo motor to move the carriage 68 and 68' by a predetermined distance (the same distance d as the image read width in the main scan direction (B) in the sub-scan direction. Thereafter, the pulley 71 is stopped. Then, the sub-scan (B) operation is restarted. Upon repetition of the main scan (B) operation, the return (E) operation in the main scan direction, and the sub-scan (D) operation, the entire original image region can be read.

The main scan direction can be reversed upon operation of a control signal 51 from the mode selecting switch 16, and the image signals can be read while main-scanning in the direction E.

FIG. 8 is a block diagram showing the entire recording apparatus according to the second embodiment. The reading portion 50 and the image forming portion 13 are basically driven by a data processing portion 110. The data processing portion 110 includes a central processing unit (CPU) 111, a memory (ROM) 112 storing a control sequence of the CPU, a memroy (RAM) 113 including counters and flags necessary for control, and the like.

A console 114 is adopted to input instructions, e.g., operation start, operation end, and the like, for the recording apparatus of the second embodiment. Although not shown, the console 114 has a plurality of operation switches, which include the mode selecting switch 16 described above.

The operation of the second embodiment with the above arrangement will be described. Note that the following control operation is performed by the above-mentioned CPU 111.

When a normal recording material is used, the control signal 51 and the color correcting parameter changing signal 15 are set at level "0", so that the read head 60 of the reading portion 50 scans in the E direction in FIG. 7 to read an image of an original. Color correction is then performed with parameters suitable for the normal recording material. Thereafter, image recording is performed by the image forming portion 13.

As described above with reference to FIG. 7, since the original S is placed on an original table (not shown) facing down, an image read in the E direction is recorded in the P direction in FIG. 5, thus performing the same image recording as the original. In a mode using the recording material shown in FIG. 3, both the control signal 51 and the color correcting parameter changing signal 15 are set at level "1". In this case, the read head 60 of the reading portion 50 reads an image of an original while scanning in the B direction in FIG. 7. Color correction is then performed by the color correcting circuit 8 with correcting parameters for obtaining the same colors as those of the normal recording material. Thereafter, the image is recorded by the image forming portion 13. In this case, since the read scan direction of the reading portion 50 is reversed, a mirror image of the original is recorded by the image forming portion 13. In this manner, in the second embodiment, a complex mirror image converting circuit 4 can be omitted.

If the read direction of the reading portion 50 is fixed and the scan direction of the ink-jet heads of the image forming portion 13 is reversed, mirror image recording can also be achieved. When the scan direction of the heads 40 of the image forming portion 13 is reversed, the overlapping order of color inks when viewed from the transparent layer 20 side can be the same as in the case of the normal recording material, and changes in color correcting parameters can be minimized. Thus, precision of color reproduction can be further improved.

The transparent layer of the recording material used in this embodiment need not be noncolored but may be colored in red, blue, or the like. The transparent layer can only be transparent as long as an image can be observed from the transparent layer side. In this case, if color correcting parameters are changed in correspondence with the color of the transparent layer, natural and bright image corresponding to each color can be formed.

According to the above embodiment described above, when image recording is performed from the back side of the recording material and a resultant image is observed from the front side, color correction is performed using color correcting parameters different from those used when an image is recorded on a normal recording material, so that an image can be reproduced in same colors as in the case wherein an image is printed on the normal recording material. In addition, since no material is applied from the image surface side, image recording with high weather resistance can be performed.

What is claimed is:

1. A color image recording apparatus comprising:
    input means for inputting color image information representing a color image;
    color correcting means for performing color correction of the color image information, and providing image signals representing the color-corrected image information, using selectable correcting parameters;
    selectively operable converting means for performing mirror-image conversion of the color image information;
    image forming means for forming an image on a recording material based on the image signals from said color correcting means; and
    mode selecting means for changing correcting parameters of said color correcting means and instructing a converting operation by said converting means, wherein said mode selecting means can select from between a first mode of operation, when a normal recording material is to be used to record the color image on a front surface of the recording material so that the color image will appear on the front surface, and a second mode of operation, when a mirror-image recording material is to be used to record the color image on a back surface of the mirror-image recording material so that the color image will appear on the front surface, and wherein said mode selecting means, when the first mode is selected, selects correcting parameters of said color correcting means for recording on the normal recording material with no mirror-image conversion by said converting means and, when the second mode is selected, selects correcting parameters of said color correcting means for recording on the mirror-image recording material and operates said converting means to provide mirror-image conversion.

2. An apparatus according to claim 1, wherein said mirror-image recording material comprises a transparent layer on a first surface and an ink absorption layer on a second surface, wherein a mirror-image of the color image is formed on said ink absorption layer.

3. An apparatus according to claim 2, wherein said color correcting means includes a plurality of memory means for storing a plurality of correcting parameters corresponding to colors and outputting the parameters upon instruction from said mode selecting means and summing means for summing the parameters output from said plurality of memory means.

4. A color image recording apparatus comprising:
    image input means for reading an original while scanning in a predetermined direction and inputting image information representing a color image;
    color correcting means for performing color correction of the image information, and providing image signals representing the color-corrected image information, using selectable correcting parameters;
    image forming means for forming an image on a recording material based on the image signals from said color correcting means while scanning in a predetermined direction;
    changing means for changing correcting parameters of said color correcting means, wherein said changing means can select from between a first mode of operation when a normal recording material is to be used to record the color image on a front surface of recording material so that the color image will appear on the front surface, and a second mode of operation, when a mirror-image recording material is to be used to record the color image on a back surface of the mirror-image recording material so that the color image will appear on the front surface, and wherein said changing means, when the first mode is selected, selects correcting parameters of said color correcting means for recording on the normal recording material and, when the second mode is selected, selects correcting parameters of said color correcting means for recording on the mirror-image recording material, said changing means selectively changing a read scan direction of the image input means and a recording scan direction of the image forming means in according with said first mode or second mode.

5. An apparatus according to claim 4, wherein said mirror-image recording material comprises a transparent layer on a first surface and an ink absorption layer on a second surface, wherein a mirror-image of the color image is formed on said ink absorption layer.

6. An apparatus according to claim 5, wherein said color correcting means includes a plurality of memory means for storing a plurality of correcting parameters corresponding to colors and outputting the parameters in accordance with the contents of said changing means and summing means for summing the parameters output from said plurality of memory means.

* * * * *